United States Patent
Kim et al.

(10) Patent No.: US 7,183,830 B2
(45) Date of Patent: Feb. 27, 2007

(54) INTEGRATED CIRCUIT AND METHOD FOR GENERATING A CLOCK SIGNAL

(75) Inventors: Sun-Kwon Kim, Suwon-si (KR); Byeong Hoon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/168,659

(22) Filed: Jun. 28, 2005

(65) Prior Publication Data
US 2005/0285654 A1 Dec. 29, 2005

(30) Foreign Application Priority Data
Jun. 29, 2004 (KR) .............. 10-2004-0049510

(51) Int. Cl.
*G06F 1/04* (2006.01)
(52) U.S. Cl. .................... 327/291; 323/282
(58) Field of Classification Search ........ 327/291–299, 327/101; 323/282–284; 363/147, 65
See application file for complete search history.

(56) References Cited

U.S. PATENT DOCUMENTS

| 6,064,275 A | 5/2000 | Yamauchi ............ 331/57 |
| 6,917,188 B2* | 7/2005 | Kernahan ............ 323/282 |

2002/0097144 A1  7/2002  Collins et al.

FOREIGN PATENT DOCUMENTS

| FR | 2843813 | 2/2004 |
| JP | 09-285109 | 10/1997 |
| KR | 100264206 | 5/2000 |
| KR | 2003-0097376 | 12/2003 |
| KR | 1020040017039 | 2/2004 |

* cited by examiner

*Primary Examiner*—Linh My Nguyen
(74) *Attorney, Agent, or Firm*—F. Chau & Associates, LLC (57) ABSTRACT

An integrated circuit for generating a clock signal includes a voltage conversion unit, a maximum power determination unit, a clock control unit and a clock generator. The voltage conversion unit converts an external power supply voltage into an internal power supply voltage and detects a variance in current consumption of a functional block to generate a detected voltage, wherein the functional block consumes a predetermined current using the internal power supply voltage. The maximum power determination unit determines a maximum current consumption of the functional block and converts the maximum current consumption to a corresponding maximum allowed voltage. The clock control unit generates at least one frequency control signal based on a comparison between the detected voltage and the maximum allowed voltage. The clock generator generates the clock signal whose frequency is adjusted according to the frequency control signal.

20 Claims, 6 Drawing Sheets

FIG. 4B

INTEGRATED CIRCUIT AND METHOD FOR GENERATING A CLOCK SIGNAL

CROSS-REFERENCE TO RELATED APPLICATION

This application claims priority under 35 USC § 119 to Korean Patent Application No. 2004-49510, filed on Jun. 29, 2004, the contents of which are herein incorporated by reference in their entirety.

TECHNICAL FIELD

The present invention relates to an integrated circuit and a method for generating a clock signal, and more particularly, to an integrated circuit and a method for generating a clock signal, which is capable of adjusting a frequency of the clock signal according to an amount of power consumed by a device, while stably maintaining an internal power supply voltage.

DESCRIPTION OF THE RELATED ART

The use of portable devices using batteries has become widespread. For such portable devices, low power consumption is an attractive factor because the device can be used more often without the need of a charge or battery replacement. One approach to reducing the power consumption of such devices is to place a system in a sleep mode when the system is idle for a period of time.

Another approach to reducing the power consumption is to adjust a probability of switching between different states for power consumption, a power voltage level or a clock frequency when the system operates in synchronization with the clock signal. An exemplary circuit for adjusting the clock frequency (or clock speed) is disclosed in Korean patent laid-open publication number 2004-17039.

The circuit of Korean patent laid-open publication number 2004-17039 detects an amount of current consumed by an integrated circuit device and adjusts the clock frequency based on the detected current consumption. When the detected current consumption is increased, the clock frequency is decreased. In addition, a reference voltage is compared with an internal power supply voltage and the comparison result is used to control a clock generation circuit. The internal power supply voltage is used as a supply voltage of the clock generation circuit.

The circuit of Korean patent laid-open publication number 2004-17039 does not vary a maximum allowed current according to an operating mode of the system. Therefore, the circuit cannot variably adjust an operational speed of the system because the circuit operates with a limited maximum allowed current. Therefore, there exists a need for an integrated circuit for generating a clock signal whose maximum current consumption is variably adjustable and capable of adjusting a frequency of the clock signal according to the adjusted maximum current consumption.

SUMMARY OF THE INVENTION

It is a feature of the present invention to provide an integrated circuit and a method for generating a clock signal capable of adjusting a frequency of the clock signal according to a maximum current consumption thereof.

In accordance with one aspect of the present invention, there is provided an integrated circuit for generating a clock signal. The integrated circuit includes a voltage conversion unit, a maximum power determination unit, a clock control unit and a clock generator. The voltage conversion unit converts an external power supply voltage into an internal power supply voltage and detects a variance in current consumption of a functional block to generate a detected voltage. The functional block consumes a predetermined amount of current using the internal power supply voltage. The maximum power determination unit determines a maximum current consumption of the functional block and converts the maximum current consumption into a corresponding maximum allowed voltage. The clock control unit generates at least one frequency control signal based on a comparison between the detected voltage and the maximum allowed voltage. The clock generator generates the clock signal whose frequency is adjusted according to the frequency control signal.

In accordance with another aspect of the present invention, there is provided a method of generating a clock signal. In the method, an external power supply voltage is converted into an internal power supply voltage and a variance in current consumption is detected to generate a detected voltage. A maximum current consumption is determined and the maximum current consumption is converted into a corresponding maximum allowed voltage. At least one frequency control signal is generated based on a comparison between the detected voltage and the maximum allowed voltage. The clock signal whose frequency is adjusted according to the frequency control signal is generated.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, which are given by way of illustration and thus do not limit the exemplary embodiments of the present invention.

DESCRIPTION OF THE EXEMPLARY EMBODIMENTS

Hereinafter, the present invention will be explained in detail with reference to the accompanying drawings.

Figure 1:
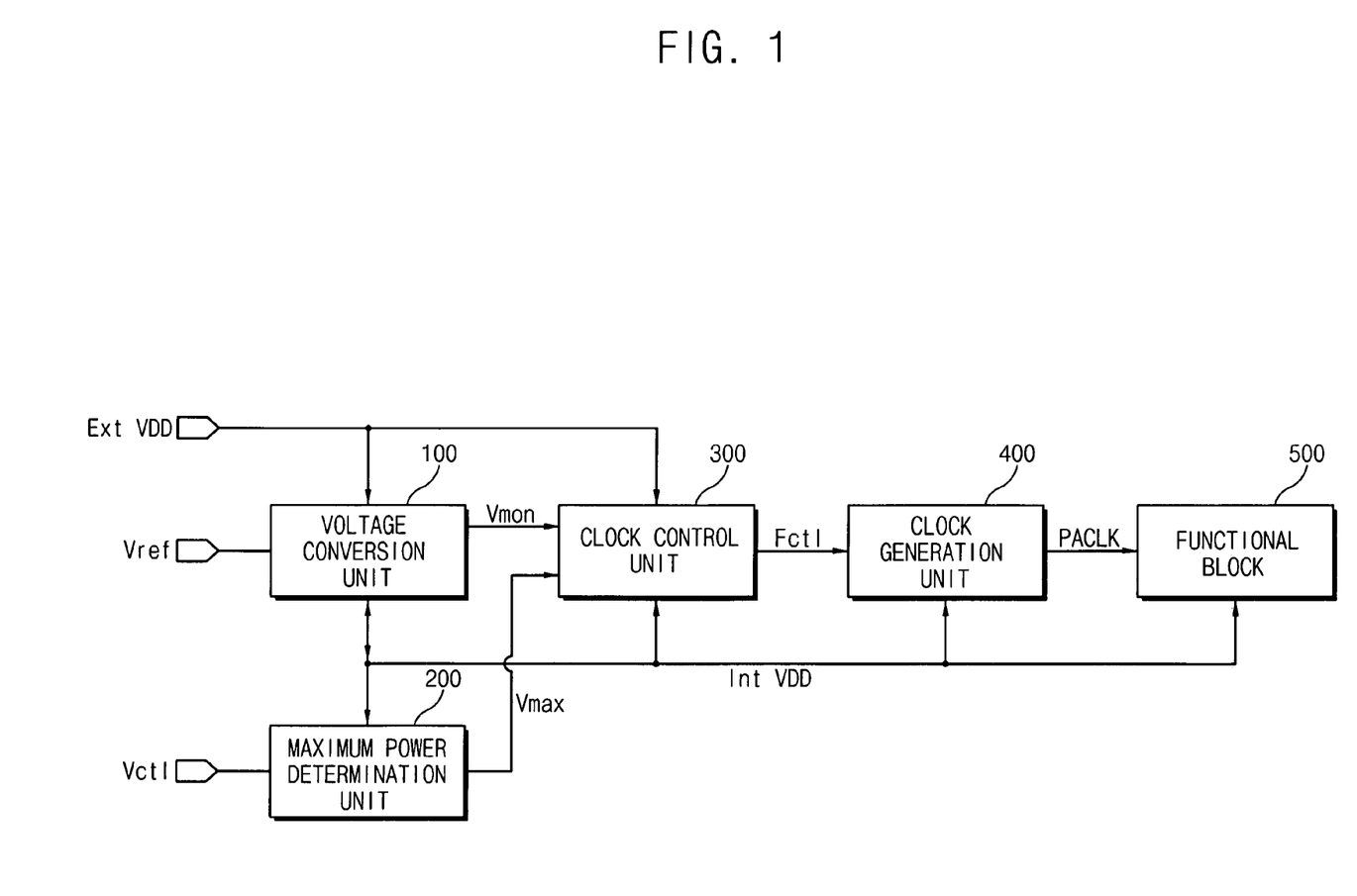
FIG. 1 is a block diagram illustrating an integrated circuit for generating a clock signal according to an exemplary embodiment of the present invention.

FIG. 1 is a circuit diagram illustrating an integrated circuit for generating a clock signal according to an exemplary embodiment of the present invention.

Referring to FIG. 1, the integrated circuit for generating a clock signal includes a voltage conversion unit 100, a maximum power determination unit 200, a clock control unit 300, a clock generation unit 400 and a functional block 500.

The voltage conversion unit 100 is supplied with an external power supply voltage Ext_VDD and a reference voltage Vref. The external power supply voltage Ext_VDD is converted into an internal power supply voltage Int_VDD by the voltage conversion unit 100. Additionally, the voltage conversion unit 100 detects a variance in current consumption of the functional block 500 to generate a detected voltage Vmon using the reference voltage Vref. When the current consumption of the functional block 500 is increased, the internal power supply voltage Int_VDD is decreased and a voltage corresponding to an amount of current consumption of the functional block 500 is also decreased. Based on a comparison between the reference voltage Vref and the voltage corresponding to the amount of current consumption of the functional block 500, the detected voltage Vmon is decreased. When the detected voltage Vmon is decreased, the current supplied by the external power supply voltage Ext_VDD is increased. Therefore, the internal power supply voltage Int_VDD may remain at a predetermined level.

The maximum power determination unit 200 determines a maximum current consumption of the integrated circuit based on an externally provided power control signal Vctl. The maximum current consumption is converted into a voltage, which is defined as a maximum allowed voltage Vmax.

The clock control unit 300 generates a frequency control signal Fctl based on a comparison between the detected voltage Vmon and the maximum allowed voltage Vmax. For example, the clock control unit 300 converts the detected voltage Vmon into a comparison voltage Vcomp and compares the comparison voltage Vcomp with the maximum allowed voltage Vmax to generate the frequency control signal Fctl.

For example, when the internal power supply voltage Int_VDD is decreased, the detected voltage Vmon is decreased and the comparison voltage Vcomp is increased based on the decreased detected voltage Vmon. The increased comparison voltage Vcomp is compared with the maximum allowed voltage Vmax to reduce a level of the frequency control signal Fctl generated by the clock control unit 300. Depending on the reduced level of the frequency control signal Fctl, a clock signal PACLK outputted from the clock generation unit 400 has a reduced frequency.

When the reduced frequency of the clock signal PACLK is provided to the functional block 500, the current consumption of the functional block 500 is decreased. Therefore, the power consumption of the integrated circuit for generating the clock signal is reduced and thus, the circuit operates in a negative feedback configuration.

Figure 2:
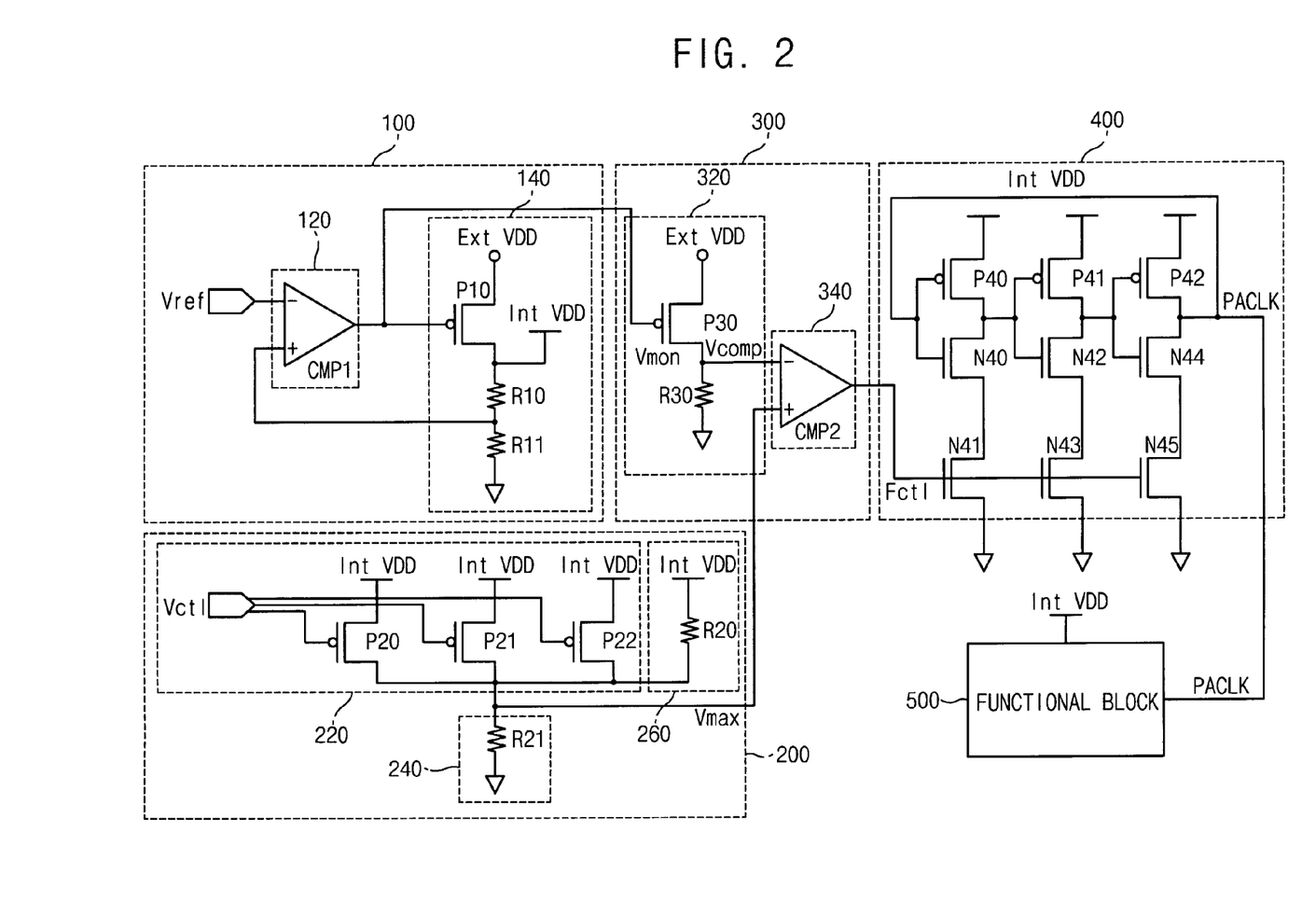
FIG. 2 is a circuit diagram illustrating an integrated circuit for generating a clock signal according to an exemplary embodiment of the present invention.

FIG. 2 is a circuit diagram illustrating an integrated circuit for generating the clock signal according to an exemplary embodiment of the present invention.

Referring to FIG. 2, the voltage conversion unit 100 includes a current detection unit 140 and a first voltage comparing unit 120.

The current detection unit 140 includes a current supply and a current detection path connected to the current supply to generate a first comparison voltage and the internal power supply voltage Int_VDD. In FIG. 2, the current supply includes a PMOS transistor P10 and the current detection path includes resistors R10 and R11.

The first voltage comparing unit 120 includes a comparator CMP1. A reference voltage Vref is applied to a negative input terminal of the comparator CMP1 and the first comparison voltage is applied to a positive input terminal of the comparator CMP1.

When the current consumption of the functional block 500 is increased, a level of the internal power supply voltage Int_VDD is decreased. Based on the decreased internal power supply voltage Int_VDD, an amount of current flowing through the resistors R10 and R11 in the current detection path is decreased. Therefore, the first comparison voltage is decreased.

For example, the comparator CMP1 corresponds to a linear comparator. Therefore, the detected voltage Vmon is decreased according to the decrease in the first comparison voltage. Because the detected voltage Vmon is applied to a gate electrode of the PMOS transistor P10 of the current supply, the decrease in the detected voltage Vmon causes a gate-to-source voltage of the PMOS transistor P10 to increase. Therefore, the amount of current flowing through the resistors R10 and R11 of the current detection path is increased and the decreased internal power supply voltage Int_VDD is increased to a predetermined level.

The maximum power determination unit 200 determines a maximum current consumption based on the externally provided power control signal Vctl and converts the maximum current consumption into the corresponding maximum allowed voltage Vmax.

The maximum power determination unit 200 includes a current consumption determination unit 220 and a maximum allowed voltage generation unit 240. The current consumption determination unit 220 determines a maximum current consumption of the functional block 500 and the maximum allowed voltage generation unit 240 generates the maximum allowed voltage Vmax.

In FIG. 2, the current consumption determination unit 220 includes a plurality of transistors P20, P21 and P22 connected in parallel and the maximum allowed voltage generation unit 240 includes a resistor R21 to convert a current flowing through a selectively turned-on transistor of the current consumption determination unit 220 into a voltage.

The transistors P20, P21 and P22 may independently operate in response to the power control signal Vctl. Additionally, a size of the respective transistors P20, P21 and P22 (e.g., a (W/L) ratio of a channel width (W) of the transistor to a channel length (L) of the transistor) may be different from one another. For example, the width to length (W/L) ratio of the transistor P21 is twice the W/L ratio of the transistor P20. In addition, the W/L ratio of the transistor P22 is four times the W/L ratio of the transistor P20.

To broaden a range of selectable maximum power consumption, at least one transistor having a different transistor size (e.g., a different W/L ratio) may be additionally disposed in parallel with the current consumption determination unit 220.

As shown in the current consumption determination unit 220, the transistors P20, P21 and P22 are selectively turned on in response to the power control signal Vctl. An amount of current flowing through the resistor R21 is determined by a source-to-gate voltage of the turn-on transistor, the W/L ratio of the turn-on transistor and the number of the turn-on transistors. Therefore, the turn-on transistor serves as a current source. The current provided from the current source (e.g., the turn-on transistor) flows through the maximum allowed voltage generation unit 240 to generate a predetermined voltage level.

The maximum allowed voltage generation unit 240 includes at least one load. In FIG. 2, the maximum allowed voltage generation unit 240 includes the resistor R21. Therefore, the current flowing through the resistor R21 determines the maximum allowed voltage Vmax.

In addition, the maximum power determination unit 200 may further include an initial allowed voltage determination unit 260. In FIG. 2, the initial allowed voltage determination unit 260 includes a resistor R20. The resistor R20 is connected between the internal power supply voltage Int_VDD and the resistor R21. When the transistors P20, P21 and P22 of the current consumption determination unit 220 are all turned off by the power control signal Vctl, the maximum allowed voltage Vmax is determined by a resistance ratio between the resistors R20 and R21. Here, the determined maximum allowed voltage Vmax is defined as an initial value of the maximum allowed voltage.

The clock control unit 300 includes a comparison voltage generator 320 and a second voltage comparing unit 340. The comparison voltage generator 320 includes a transistor P30 that is a current mirror of the transistor P10 of the current detection unit 140. Namely, a gate of the transistor P10 is coupled to a gate of the transistor P30 of the comparison voltage generator 320 and gate-to-source voltages of the two transistors P10 and P30 are the same. Therefore, a source-to-drain current of the transistor P30 is determined by a size ratio between the two transistors P10 and P30. The source-to-drain current of the transistor P30 is generated by mirroring a current in the transistor P10 of the current detection unit 140.

Therefore, the transistor P30 of the comparison voltage generator 320 serves as a voltage-controlled current source. In addition, the comparison voltage generator 320 includes a resistor R30 to convert the current provided from the voltage-controlled current source (e.g., the transistor P30) to a voltage. It is noted that the comparison voltage generator 320 may include two or more resistors to convert the current provided from the voltage-controlled current source to a voltage.

Thus, in a large signal analysis, a bias current of the comparison voltage generator 320 is proportional to a bias current through a source-to-drain of the transistor P10 of the current detection unit 140. When the bias current of the transistor P10 increases, the bias current of the transistor P30 is also increased proportionally to the bias current of the transistor P10. The bias current ratio between the two transistors P10 and P30 is determined by the size ratio (e.g., the W/L ratio) of the transistors P10 and P30.

When the detected voltage Vmon decreases, a source-to-gate voltage of the transistor P30 increases and a bias current through a source-to-drain of the transistor P30 also increases. Depending on the increased bias current, a voltage applied to a negative input terminal of a comparator CMP2 of the second voltage comparing unit 340 is increased. Additionally, the voltage applied to the negative input terminal of the comparator CMP2 is compared with the maximum allowed voltage Vmax that is applied to a positive input terminal of the comparator CMP2 to generate the frequency control signal Fctl. Based on the frequency control signal Fctl, the clock signal PACLK has a predetermined frequency.

In FIG. 2, the clock generation unit 400 includes a ring oscillator in which three inverters are serially connected. Alternatively, the clock generation unit 400 may include a voltage-controlled oscillator (VCO) to produce a frequency adjusted based upon control of a voltage.

The clock generation unit 400 generates the clock signal PACLK having a frequency adjusted based upon the frequency control signal Fctl and provides the clock signal PACLK to the functional block 500.

The functional block 500 is supplied with power based on the internal power supply voltage Int_VDD to perform predetermined functions.

Figure 3A:
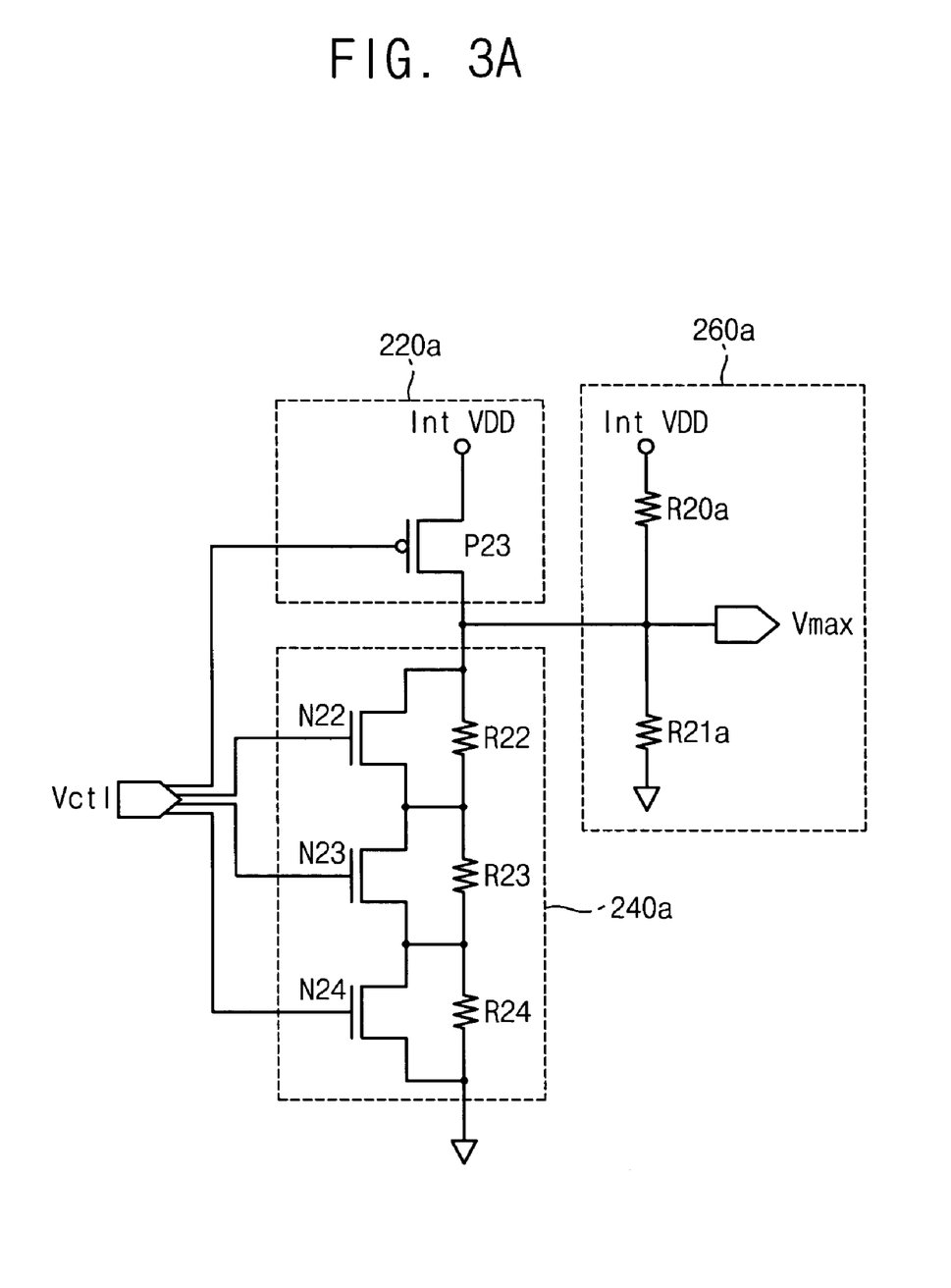
FIG. 3A is a circuit diagram illustrating a maximum power determination unit according to an exemplary embodiment of the present invention.
Figure 3B:
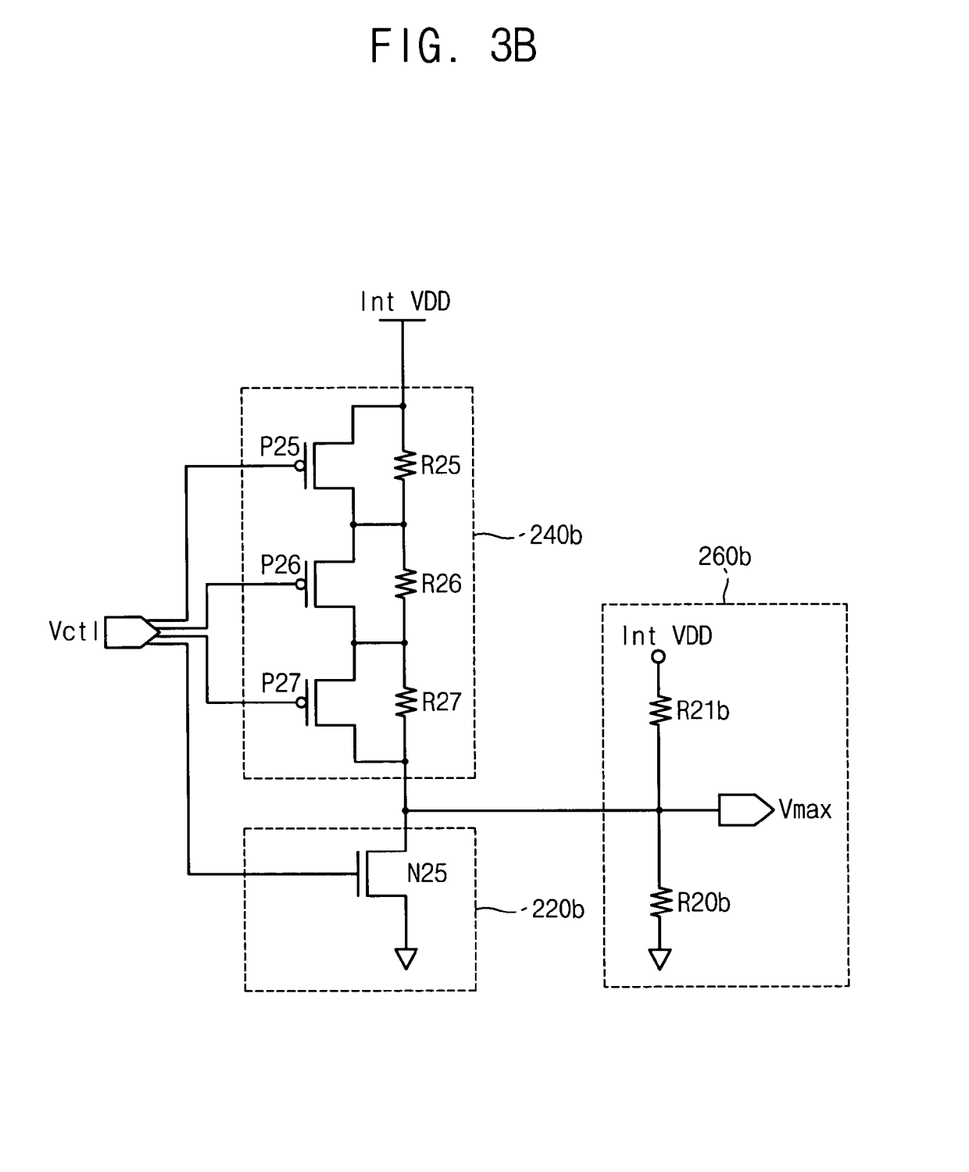
FIG. 3B is a circuit diagram illustrating a maximum power determination unit according to another exemplary embodiment of the present invention.

FIG. 3A is a circuit diagram illustrating the maximum power determination unit 200 according to an exemplary embodiment of the present invention and FIG. 3B is a circuit diagram illustrating the maximum power determination unit 200 according to another exemplary embodiment of the present invention.

Referring to FIG. 3A, the maximum power determination unit 200 includes a current consumption determination unit 220a having at least one current source. In FIG. 3A, the current consumption determination unit 220a includes a PMOS transistor P23 as the current source. Alternatively, the current consumption determination unit 220a may include a plurality of transistors in parallel and coupled to one another.

The maximum power determination unit 200 further includes a maximum allowed voltage generation unit 240a. The maximum allowed voltage generation unit 240a includes serially coupled resistors R22, R23 and R24 and transistors N22, N23 and N24 that are coupled in parallel to the resistors R22, R23 and R24, respectively.

The transistor P23 has load impedance that varies according to the power control signal Vctl. In other words, the load impedance of the transistor P23 is adjusted by the transistors N22, N23 and N24 that are selectively turned on by the power control signal Vctl.

The maximum power determination unit 200 may further include an initial allowed voltage determination unit 260a to determine the initial value of the maximum allowed voltage. In FIG. 3A, the initial allowed voltage determination unit 260a includes resistors R20a and R21a. The resistor R20a is coupled between the internal power supply voltage Int_VDD and the maximum allowed voltage generation unit 240a and the resistor R21a is coupled between the maximum allowed voltage generation unit 240a and a ground.

The initial allowed voltage determination unit 260a prevents the maximum allowed voltage Vmax from being coupled to the internal power supply voltage Int_VDD or the ground by the transistor P23 of the current consumption determination unit 220a and the transistors N22, N23 and N24 of the maximum allowed voltage generation unit 240a that are selectively turned on or turned off based on the power control signal Vctl.

In addition, even though the power control signal Vctl is in a floating state, the maximum allowed voltage Vmax has a predetermined voltage level. Namely, the maximum allowed voltage Vmax may have a predetermined voltage level before the transistors P23, N22, N23 and N24 start to operate based on the power control signal Vctl. Here, the maximum allowed voltage Vmax is defined as the initial value of the maximum allowed voltage.

Referring to FIG. 3B, the maximum power determination unit 200 includes a current consumption determination unit 220b having at least one current source. In FIG. 3B, the current consumption determination unit 220b includes an NMOS transistor N25 as the current source. Alternatively, the current consumption determination unit 220b may include a plurality of transistors in parallel and coupled to one another.

A maximum allowed voltage generation unit 240b includes serially coupled resistors R25, R26 and R27 and transistors P25, P26 and P27 that are coupled in parallel to the resistors R25, R26 and R27, respectively. The transistor N25 has a load impedance that varies according to the power control signal Vctl. In other words, the load impedance of the transistor N25 is adjusted by the transistors P25, P26 and P27 that are selectively turned on by the power control signal Vctl.

The maximum power determination unit 200 may further include an initial allowed voltage determination unit 260b. In FIG. 3b, the initial allowed voltage determination unit 260b includes resistors R20b and R21b. The resistor R21b is coupled between the internal power supply voltage Int_VDD and the current consumption determination unit 220b and the resistor R20b is coupled between the maximum allowed voltage generation unit 240b and a ground.

The initial allowed voltage determination unit 260b prevents the maximum allowed voltage Vmax from being coupled to the internal power supply voltage Int_VDD or the ground by the transistor N25 of the current consumption determination unit 220b and the transistors P25, P26 and P27 of the maximum allowed voltage generation unit 240b that are selectively turned on or turned off based on the power control signal Vctl. In addition, even though the power control signal Vctl is in a floating state, the maximum allowed voltage Vmax has a predetermined voltage level. Therefore, the maximum allowed voltage Vmax may have a predetermined voltage level before the transistors start to operate based on the power control signal Vctl. Here, the maximum allowed voltage Vmax is defined as the initial value of the maximum allowed voltage.

Figure 4A:
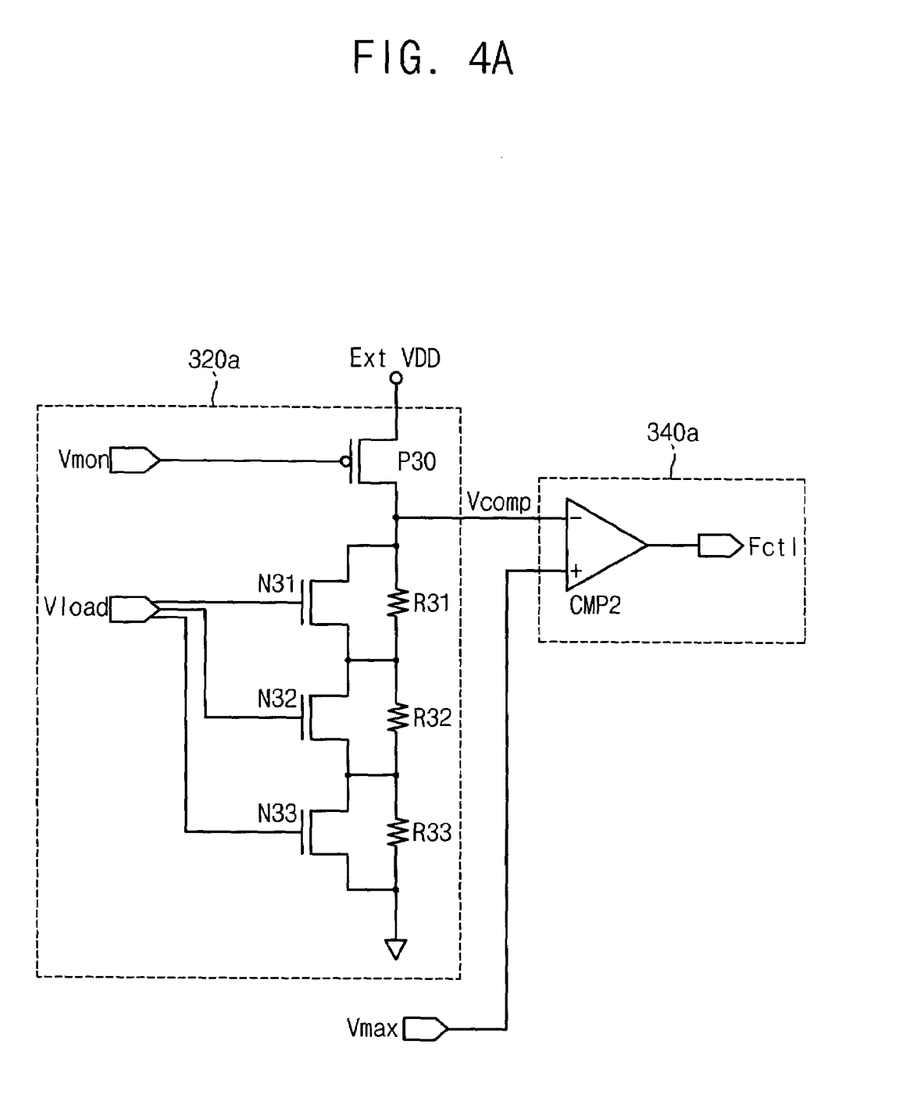
FIG. 4A is a circuit diagram illustrating a clock control unit according to an exemplary embodiment of the present invention.
Figure 4B:
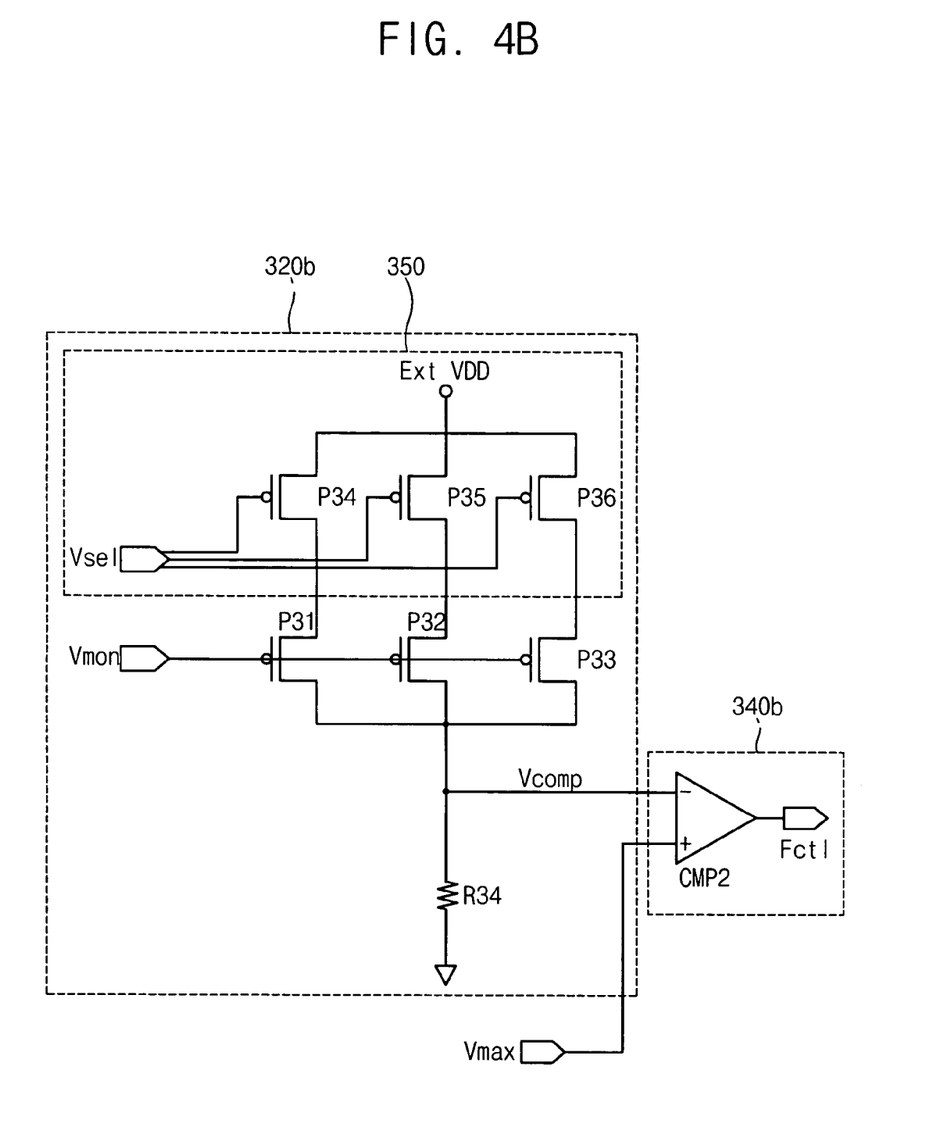
FIG. 4B is a circuit diagram illustrating a clock control unit according to another exemplary embodiment of the present invention.

FIG. 4A is a circuit diagram illustrating the clock control unit 300 according to an exemplary embodiment of the present invention and FIG. 4B is a circuit diagram illustrating the clock control unit 300 according to another exemplary embodiment of the present invention.

Referring to FIG. 4A, the clock control unit 300 includes a comparison voltage generator 320a and a second voltage comparing unit 340a that includes the comparator CMP2. The comparison voltage generator 320a includes transistors P30, N31, N32 and N33 and resistors R31, R32 and R33. The transistor P30 may operate in a saturation region. The transistors N31, N32 and N33 are used to adjust a load impedance of the transistor P30.

The transistors N31, N32 and N33 are selectively turned on by a load control signal Vload that is externally inputted to adjust the load impedance of the transistor P30. The adjusted load impedance of the transistor P30 controls the comparison voltage Vcomp that is applied to a drain electrode of the transistor P30.

Referring to FIG. 4B, the clock control unit 300 includes a comparison voltage generator 320b, a second voltage comparing unit 340b that includes the comparator CMP2 and a current source selection unit 350. The current source selection unit 350 includes transistors P34, P35 and P36. The transistors P34, P35 and P36 are selectively turned on by a selection signal Vsel. The transistors P31, P32 and P33 of the comparison voltage generator 320b are connected to the external power supply voltage Ext_VDD via the selectively turned-on transistor of the transistors P31, P32 and P33. A transistor that is electrically coupled to the external power supply voltage Ext_VDD may mirror a current through the transistor P20 in FIG. 2.

Alternatively, the transistors used to adjust the load impedance in FIG. 4A may be used in FIG. 4B. Namely, the transistors N31, N32, N33 and the resistors R31, R32 and R33 controlled by the load control signal Vload may replace a resistor R34 in FIG. 4B.

According to an exemplary embodiment of the present invention, a level of the detected voltage Vmon is adjusted and provided to the second comparator CMP2. When the adjusted detected voltage Vmon has a voltage level exceeding the maximum allowed voltage Vmax, the level of the frequency control signal Fctl generated by the comparator CMP2 is reduced. Depending on the decrease in the level of the frequency control signal Fctl, the frequency of the clock signal PACLK is decreased and therefore, the power consumption of the functional block 500 that exceeds the maximum allowed voltage Vmax is reduced.

According to an exemplary embodiment of the present invention, the frequency of the clock signal may be controlled within the determined maximum current consumption so that the frequency of the clock signal applied to the functional block is precisely controlled according to the power consumption of the functional block, while an internal voltage is substantially maintained. Additionally, the current consumption of the functional block may be effectively controlled considering the performance and power consumption of the functional block.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. An integrated circuit for generating a clock signal, comprising:
   a voltage conversion unit configured to convert an external power supply voltage into an internal power supply voltage, detect a variance in current consumption of a functional block and generate a detected voltage, wherein the functional block consumes an amount of current using the internal power supply voltage;
   a maximum power determination unit configured to determine a maximum current consumption of the functional block and convert the maximum current consumption into a corresponding maximum allowed voltage;
   a clock control unit configured to generate at least one frequency control signal based on a comparison between the detected voltage and the maximum allowed voltage; and
   a clock generator configured to generate the clock signal, wherein a frequency of the clock signal is adjusted according to the frequency control signal.

2. The integrated circuit of claim 1, wherein the voltage conversion unit includes:
   a current detection unit configured to generate a first comparison voltage and the internal power supply voltage; and
   a first comparator configured to compare the first comparison voltage with an input reference voltage to generate the detected voltage.

3. The integrated circuit of claim 2, wherein the current detection unit includes:
   a current detection path configured to reduce a voltage level of the first comparison voltage when the current consumption of the functional block is increased; and
   a current supply configured to provide current to the current detection path and the functional block.

4. The integrated circuit of claim 3, wherein an amount of current supplied by the current supply is adjusted according to the detected voltage.

5. The integrated circuit of claim 1, wherein the maximum power determination unit includes:
   a current consumption determination unit configured to determine the maximum current consumption of the functional block based on the power control signal; and a maximum allowed voltage generation unit configured to generate the maximum allowed voltage corresponding to an output current of the current consumption determination unit.

6. The integrated circuit of claim 5, wherein the current consumption determination unit includes:
a plurality of current sources connected in parallel, wherein the current sources are selectively turned on by the power control signal.

7. The integrated circuit of claim 6, wherein the maximum allowed voltage generation unit includes:
a load for generating the maximum allowed voltage based on a current supplied from at least one selectively turned-on current source of the current sources.

8. The integrated circuit of claim 5, wherein the current consumption determination unit includes:
a current source that is selectively turned on by the power control signal.

9. The integrated circuit of claim 8, wherein a load impedance of the maximum allowed voltage generation unit is adjusted according to the power control signal.

10. The integrated circuit of claim 9, wherein the current consumption determination unit further includes:
an initial allowed voltage determination unit for determining an initial value of the maximum allowed voltage.

11. The integrated circuit of claim 1, wherein the clock control unit includes:
a comparison voltage generator configured to generate a comparison voltage based on the detected voltage; and
a second comparator configured to compare the comparison voltage with the maximum allowed voltage to generate a frequency control signal.

12. The integrated circuit of claim 11, wherein the comparison voltage generator includes:
at least one voltage controlled current source for generating a current based on the detected voltage; and
at least one load for generating the comparison voltage based on the current supplied from the at least one voltage-controlled current source.

13. The integrated circuit of claim 12, wherein a load impedance of the comparison voltage generator is variably adjusted.

14. The integrated circuit of claim 12, wherein the maximum power determination unit further includes:
a current source selection unit that selectively turns on the at least one voltage-controlled current source.

15. The integrated circuit of claim 1, wherein the clock generator includes:
a ring oscillator in which three inverters are serially connected.

16. The integrated circuit of claim 1, wherein the clock generator includes:
a voltage controlled oscillator.

17. A method of generating a clock signal, comprising:
converting an external power supply voltage into an internal power supply voltage and detecting a variance of the internal power supply voltage to generate a detected voltage;
determining a maximum current consumption to convert the maximum current consumption into a corresponding maximum allowed voltage;
generating at least one frequency control signal based on a comparison between the detected voltage and the maximum allowed voltage; and
generating the clock signal, wherein a frequency of the clock signal is adjusted according to the frequency control signal.

18. The method of claim 17, wherein the step of converting the maximum current consumption includes:
selectively turning on at least one current source; and
providing a current from the selectively turned-on current source to a load coupled to the at least one current source.

19. The method of claim 18, wherein the step of generating at least one frequency control signal includes:
generating a comparison voltage corresponding to the detected voltage;
comparing the comparison voltage with the maximum allowed voltage; and
generating the frequency control signal based on the comparison between the comparison voltage and the maximum allowed voltage.

20. The method of claim 17, wherein the step of converting an external power supply voltage into an internal power supply voltage and detecting a variance of the internal power supply voltage to generate a detected voltage includes:
generating a first comparison voltage and the internal power supply voltage; and
comparing the first comparison voltage with an input reference voltage to generate the detected voltage.

* * * * *